Figure 2:
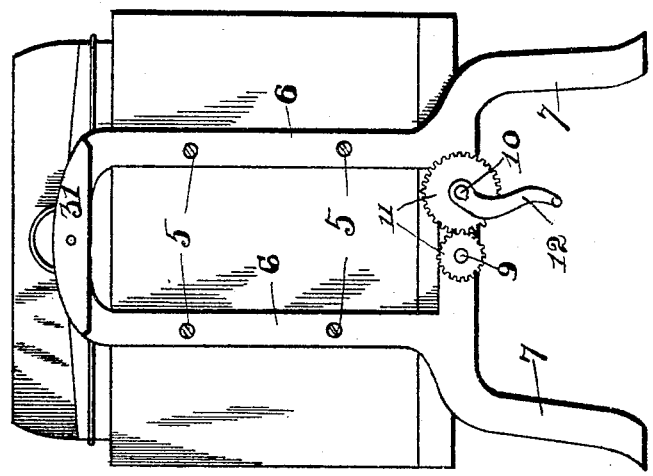

No. 805,855. PATENTED NOV. 28, 1905.
H. HOUSHOLDER.
CHURN.
APPLICATION FILED AUG. 11, 1905.

2 SHEETS—SHEET 1.

Witnesses.
C. A. Rudolph
K. W. Butler

Inventor.
Henry Housholder
By H. C. Everto & Co.
Attorneys.

No. 805,855. PATENTED NOV. 28, 1905.
H. HOUSHOLDER.
CHURN.
APPLICATION FILED AUG. 11, 1905.

2 SHEETS—SHEET 2.

Witnesses.
C. A. Rudolph.
H. H. Butler.

Inventor:
Henry Housholder.
By H. C. Everts & Co.
Attorneys.

UNITED STATES PATENT OFFICE.

HENRY HOUSHOLDER, OF ELIZABETH, PENNSYLVANIA.

CHURN.

No. 805,855.     Specification of Letters Patent.     Patented Nov. 28, 1905.

Application filed August 11, 1905. Serial No. 273,782.

*To all whom it may concern:*

Be it known that I, HENRY HOUSHOLDER, a citizen of the United States of America, residing at Elizabeth, in the county of Allegheny and State of Pennsylvania, have invented certain new and useful Improvements in Churns, of which the following is a specification, reference being had therein to the accompanying drawings.

This invention relates to certain new and useful improvements in churns; and the invention has for its object to provide a novel form of churn embodying novel means for rapidly churning cream. In this connection I have devised a churn particularly adapted for family use, where small quantities of cream are to be churned, and in constructing my improved churn I have provided a portion of the same for use as a receptacle, which can be used independently of the remainder of the churn. To this end I have constructed a casing in which a receptacle is mounted, and in connection with the casing I have provided means for agitating the contents of the receptacle, said means being constructed whereby it can be easily and quickly removed when it is desired to cleanse the same. I also employ a thermometer for determining the temperature of the contents of the receptacle and a faucet for withdrawing the liquid contents of the receptable after the churn has been used.

The above construction will be hereinafter more fully described and then specifically pointed out in the claims, and, referring to the drawings accompanying this application, like numerals of reference designate corresponding parts throughout the several views, in which—

Figure 1:
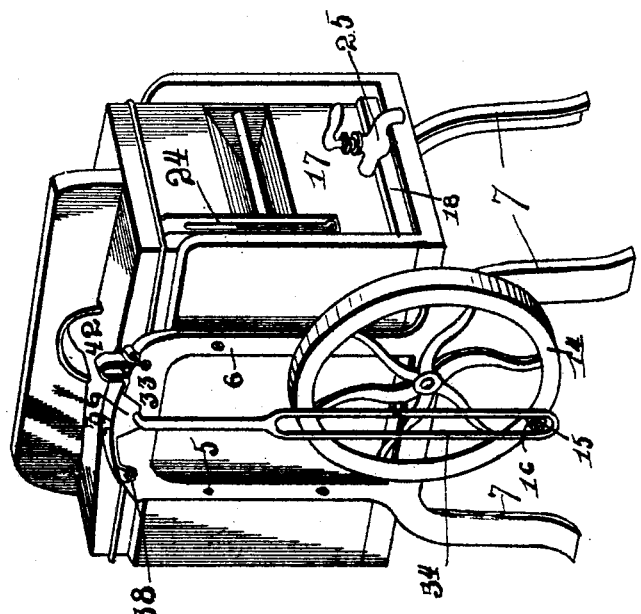
Figure 3:
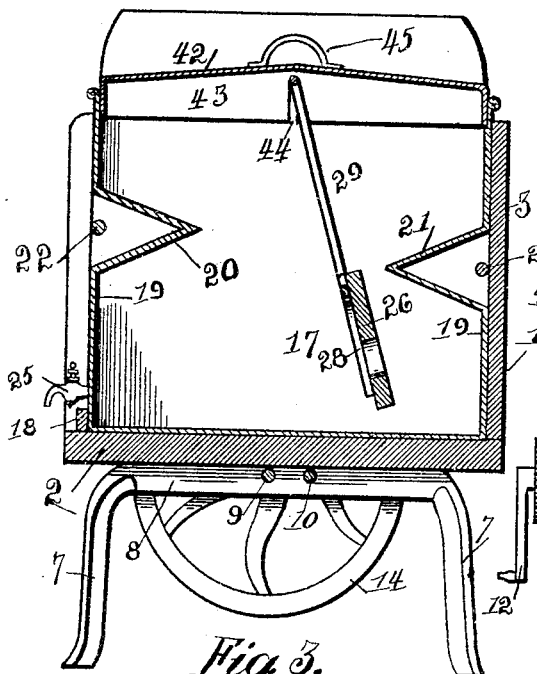
Figure 4:
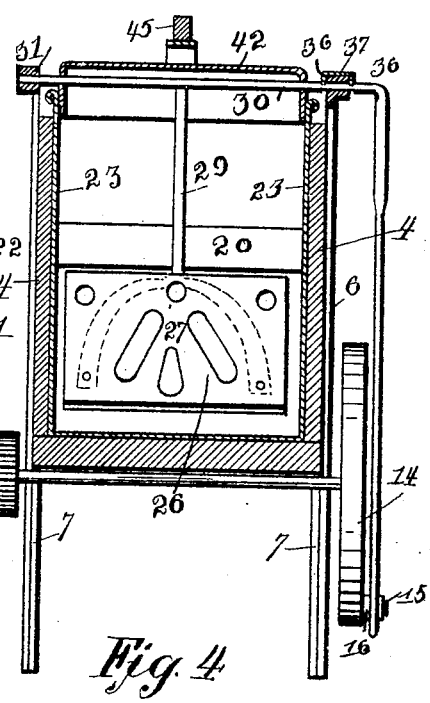
Figure 5:
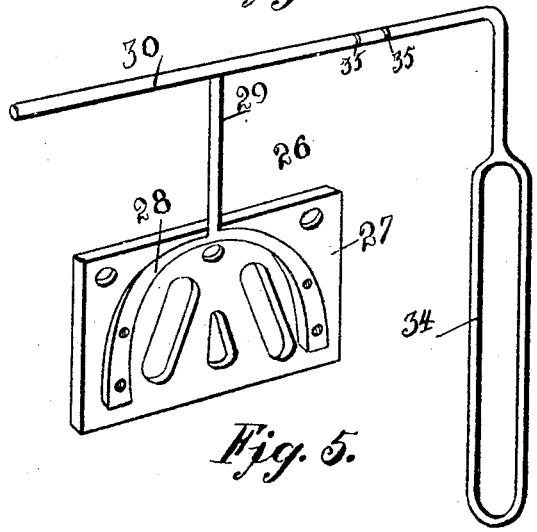
Figure 6:
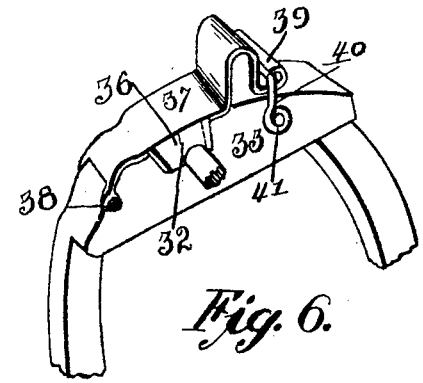

Figure 1 is a perspective view of my improved churn. Fig. 2 is a side elevation of the same. Fig. 3 is a longitudinal sectional view of the churn. Fig. 4 is a vertical transverse sectional view of the same. Fig. 5 is a perspective view of the dasher or agitating means used in connection with the churn, and Fig. 6 is a fragmentary perspective view of a novel form of clamp.

To put my invention into practice, I construct my improved churn of a casing 1, which is preferably made of wood. This casing consists of a bottom plate 2, an end board 3, and side boards 4 4, thus forming a structure having an open end and an open top. Connected to the side boards 4 4, as at 5, are metallic frames 6, having depending supporting-legs 7 7. The frames 6 are substantially rectangular in elevation, and the lower side of each frame projects slightly below the bottom plate 2 of the casing, as at 8, and between the frames 6 6 at each side of the casing are journaled shafts 9 and 10, the ends of the shafts upon one side of the casing being provided with meshing gear-wheels 11 11 and the shaft 10 being provided with a conventional form of crank-handle 12, whereby when the shaft 10 is rotated a similar movement will be imparted to the shaft 9 through the medium of the gear-wheels 11 11. The opposite end of the shaft 9 is provided with a large balance-wheel 14, carrying a crank-pin 15, upon which is mounted a roller 16. The object of this crank-pin will be hereinafter more fully described.

In connection with the casing I employ a substantially rectangular receptacle 17, which is made of a non-corrosive material, as galvanized iron or tin-plate. The receptacle 17 is adapted to fit within the casing and is retained therein by a cleat 18, which is arranged transversely of the bottom plate 2 near the open end of the casing. The ends 19 19 of the receptacle are provided with two indentations 20 and 21, these indentations forming recesses for handles 22 22, which are mounted between the side walls 23 23 of the receptacle. The indentation 20 is located slightly above the indentation 21, the object of which will presently appear in the operation of my improved churn. The one end of the receptacle 17 is provided with a conventional form of thermometer 24, whereby the temperature of the contents of the receptacle can be determined from the exterior of said receptacle. The receptacle at its one end is also provided with a faucet or spigot 25, whereby the liquid contents of the receptacle can be removed after it has been used.

To agitate the contents of the receptacle, I employ a dasher 26, which consists of a perforated plate 27, secured to the bifurcated end 28 of the depending rod 29, this rod being carried by a rock-shaft 30. The one end of the rock-shaft is journaled in the top 31 of one of the frames 6, while the opposite end of the rock-shaft rests in a slot 32, formed in the top 33 of the other frame 6. This end of the rock-shaft is provided with a depending yoke 34, adapted to engage over the roller 16 of the crank-pin 15, carried by the balance-wheel 14.

To retain the rock-shaft 30 in proper relation to the receptacle 17 and the balance-wheel 14, I provide the rock-shaft with peripheral grooves 35 35, and adapted to engage in these grooves are the depending sides 36 36 of a clamp 37, employed to retain the rock-shaft in engagement with the upper end of the frame 6. The clamp 37 is hinged, as at 38, to the frame 6, while the opposite end of the clamp is bent to form a resilient member 39, which is engaged by a stirrup 40, pivoted at 41 to the upper end 33 of the frame 6.

A lid 42 fits upon the receptacle 17, the depending sides 43 43 of said lid being slotted, as at 44, to receive the rock-shaft 30. This lid is provided with a conventional form of handle 45.

Operation: When the different parts of my improved churn have been assembled in operative position, as shown in Figs. 3 and 4 of the drawings, the cream to be churned is placed within the receptacle 17 and the lid placed thereon. When the shaft 10 is rotated through the medium of the crank 12, the shaft 30 will be rocked through the medium of the shaft 9, balance-wheel 14, crank-pin 15, and yoke 34, and the dasher 26 will be reciprocated within the receptacle, agitating the contents thereof. During this operation the temperature of the contents of the receptacle may be observed by the thermometer 24, used in connection with the same, and in case cream is being churned to form butter the buttermilk can be withdrawn at any time desired through the medium of the faucet 25.

By forming one of the indentations in the ends of the receptacle higher than the other indentation the butter will accumulate beneath the uppermost indentation, and from this end of the receptacle it can be removed at any time desired. The positioning of the indentations of the receptacle simply adds to the convenient features of the churn.

The receptacle 17 can be readily used for other purposes when not used in connection with the churn, and for this reason I have provided the handles 22 22, which permit of the receptacle being easily carried.

I do not care to confine myself to the clamp employed for locking the rock-shaft in position to be actuated, as various other forms of clamps can be readily used for this purpose.

What I claim, and desire to secure by Letters Patent, is—

1. A churn embodying a housing, a container removably supported therein, a rock-shaft removably journaled in said housing, a dasher mounted upon said shaft, means for imparting rotary movement to said shaft and a clamp for holding said shaft upon said housing composed of vertical side frames and a casing arranged therebetween embodying a member formed with depending sides engaging said shaft in concentric disposition, said member being formed with a hooked end and means for engaging said hooked end to lock said clamp in position.

2. A churn embodying a housing, a container removably supported within said casing, a rock-shaft removably journaled in said side frames adjacent the top of said housing, a depending dasher carried by said shaft and projecting into said container, means for imparting vibratory motion to said rock-shaft, said shaft being formed on each side with spaced peripheral parallel grooves and clamps for holding said shaft in said side frames embodying a metallic clamping member pivotally mounted adjacent each side of said housing, said clamping member being formed with depending side walls adapted to interfit in said grooves, and being further formed with a hooked end, and a pivoted yoke mounted adjacent said clamping member and adapted to engage the hooked end thereof to lock the same in position.

In testimony whereof I affix my signature in the presence of two witnesses.

HENRY HOUSHOLDER.

Witnesses:
M. E. LAWSON,
K. H. BUTLER.